United States Patent [19]

Schaeffer et al.

[11] 4,276,102
[45] Jun. 30, 1981

[54] METHOD FOR COMPACTING TRANSPOSED CABLE STRANDS

[75] Inventors: Friedrich K. Schaeffer, Cheshire, Mass.; Thomas F. Brennan, Ft. Wayne, Ind.

[73] Assignee: General Electric Company, N.Y.

[21] Appl. No.: 145,278

[22] Filed: Apr. 30, 1980

Related U.S. Application Data

[63] Continuation-in-part of Ser. No. 72,377, Sep. 4, 1979, abandoned.

[51] Int. Cl.³ .............................................. B29C 27/00
[52] U.S. Cl. ...................................... 156/85; 174/34; 174/DIG. 8
[58] Field of Search ............... 156/85, 86, 84; 174/34, 174/107, 108, 110 FC, 113 A, DIG. 8; 310/64, 213

[56] References Cited

U.S. PATENT DOCUMENTS

| | | | |
|---|---|---|---|
| 3,011,082 | 11/1961 | Ahrens | 310/213 |
| 3,048,651 | 8/1962 | Howard et al. | 174/DIG. 8 |
| 3,159,513 | 12/1964 | Baier | 174/DIG. 8 |
| 3,283,280 | 11/1966 | Fischer | 174/34 |
| 3,297,970 | 1/1967 | Jones | 174/DIG. 8 |
| 3,702,499 | 11/1972 | Virsbreg | 174/DIG. 8 |

FOREIGN PATENT DOCUMENTS 867763  5/1961  United Kingdom .............. 174/DIG. 8

*Primary Examiner*—Caleb Weston
*Attorney, Agent, or Firm*—Richard A. Menelly

[57] ABSTRACT

A heat shrinkable polymeric material is wrapped around a plurality of adhesive coated wire strands placed together in a transposed configuration prior to heating the strands to cause the adhesive to melt and cure. The shrink initiation temperature of the polymeric material is selected to exceed the temperature at which the adhesive melts while preceeding the temperature at which the latent catalyst initiates the cure cycle. The shrinking of the polymeric wrapping causes the transposed cable strands to become compacted and substantially increases the surface area of the strands in contact with the adhesive material.

7 Claims, 8 Drawing Figures

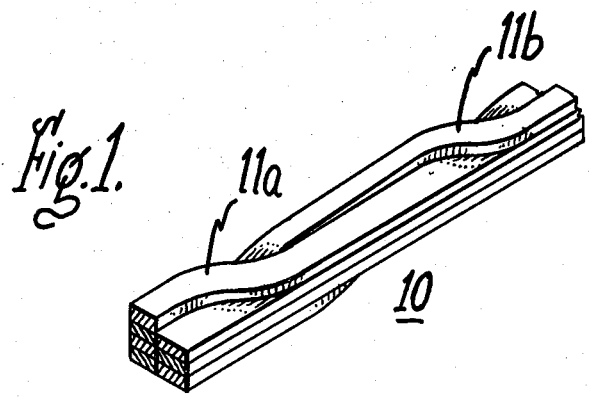
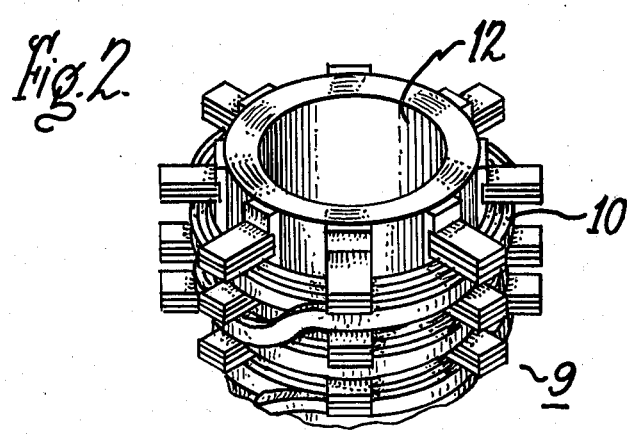
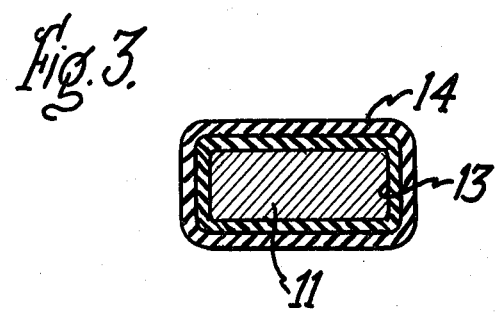

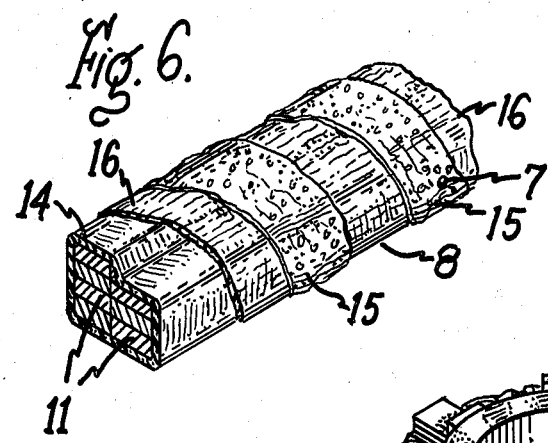
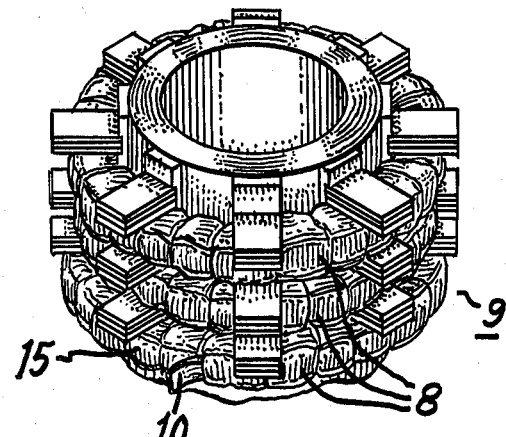
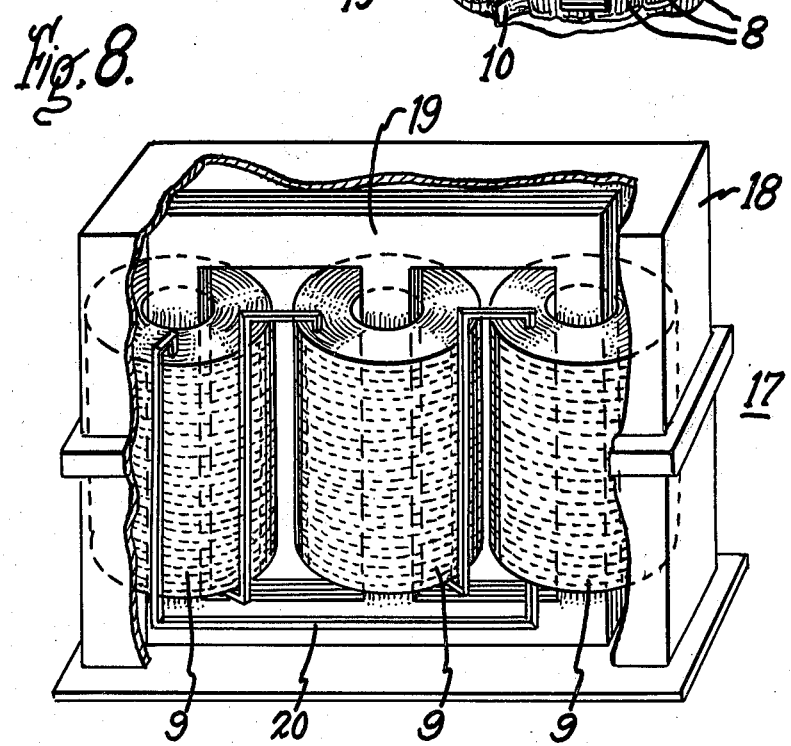

METHOD FOR COMPACTING TRANSPOSED CABLE STRANDS

This is a Continuation in Part of Application Ser. No. 72,377, filed Sept. 4, 1979, and now abandoned.

BACKGROUND OF THE INVENTION

Transposed cables are used in high power transformers for reducing the circulating currents that otherwise occur between electrical conductors in close proximity and in a side-by-side relationship. In order to cause the strands to adhere to each other for the purpose of resisting short circuit forces, which tend to cause the strands to separate, a layer of adhesive material is applied to each individual strand. Since the actual contact area held by the adhesive material represents approximately 10 percent of the available contact surface, added strand material is generally provided to insure resistance to the shear forces. The added strand material adds to the over-all transformer cost since expensive copper alloys are required for good electrical conductivity, and further, since added transformer volume and dielectric coolants are required to contain the added copper material.

The purpose of this invention is to provide methods and materials for compacting the individual transposed cable strands in order to provide for greater adhesive contact between the individual strands so that less strand material can be employed.

SUMMARY OF THE INVENTION

The invention comprises the addition of a heat shrinkable polymeric layer wrapped around a cable of adhesively coated transposed strands prior to heating the cable to melt the adhesive. The heat shrinking properties of the polymeric material are selected to lie between the temperature at which the adhesive melts and the temperature at which adhesive cure is initiated. The shrinking of the polymeric material while the adhesive is in a liquid condition causes a substantial increase in the contact area between the individual cable strands.

BRIEF DESCRIPTION OF THE DRAWINGS

FIG. 1 is a side perspective view of a transposed cable for use with the method and materials of the invention;

FIG. 2 is a top perspective view of a few layers of transposed cables around a winding cylinder for use within a power transformer;

FIG. 3 is a cross section view of an adhesive coated cable strand for use within the cable of FIG. 1;

FIG. 6 is a top perspective view of the cable depicted in FIG. 5;

FIG. 7 is a top perspective view of the winding of FIG. 2 including a wrapping of polymeric material around the cable layers; and FIG. 8 is a top perspective view in partial section of a transformer containing windings of transposed cable according to the invention.

DESCRIPTION OF THE PREFERRED EMBODIMENT

Figure 4:
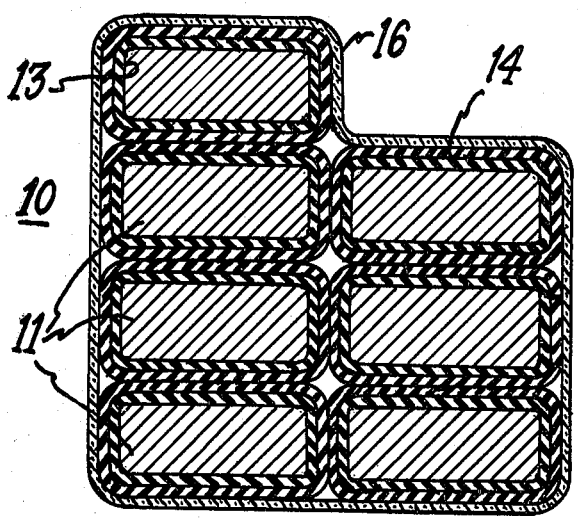
FIG. 4 is a cross section view of a transposed cable containing an insulating paper wrapping.

FIG. 1 contains a transposed cable 10 of the type wherein a plurality of wire strands are interposed in a transposed configuration for the purpose of reducing magnetic transaction between the individual strands. The configuration of FIG. 1 for example shows one strand 11a transposed relative to an adjoining strand 11b in an overlapping transposed arrangement. In forming a transformer winding a plurality of transposed cables 10 are arranged around a winding cylinder 12, as shown in FIG. 2, to complete a transformer winding 9. As discussed earlier one of the problems involved in using transposed cables within transformer windings is the tendency of the individual strands to become separated under transformer short circuit conditions. FIG. 3 shows an individual cable strand 11 containing a layer of insulating enamel 13 which is applied to the strand in order to electrically insulate the individual strands within the cable. An adhesive layer 14 is applied over the insulating enamel 13 in order to cause the individual strands to adhere to each other and to substantially increase the cable resistance to separation under the aforementioned shear force effects. A completed cable configuration 10 is shown in FIG. 4 wherein a plurality of individual strands 11 containing the adhesive coating 14 are wrapped with an outer layer of insulating paper 16 to provide insulation between the cable and other internal elements within a transformer casing.

When transformer windings are caused to fail under repeated subjection to short circuit shear forces, the separated cable strands are found to adhere to each other at only scattered portions along the adjacent strand surface. It was discovered therefore, that some means must be provided during the adhesive melting operation to force the individual strands into intimate contact in order to assure that the melted adhesive intermixes between the individual strands in its melted state and remains in intimate contact while the adhesive undergoes a thermosetting chemical reaction.

Figure 5:
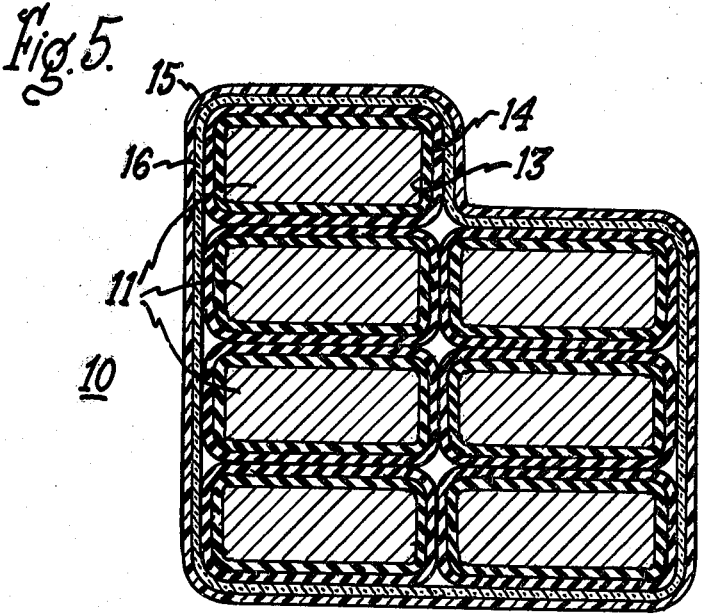
FIG. 5 is an enlarged cross section view of the transposed cable of FIG. 4 including a wrapping of a polymeric material.

One means for providing compaction to the transposed cable during the adhesive melting operation is shown in FIG. 5 and consists in the application of a layer of mylar film 15 around transposed cable 10 containing the usual adhesive coated strands 11. The mylar material 15 is selected to have a shrink initiation temperature of approximately 90° C. when the adhesive material 14 comprises an epoxy having a melt temperature of approximately 70° C. The mylar 15 shrinks therefore, while the epoxy 14 is liquid and forces the individual strands 11 into a tight compact arrangement and holds the individual strands 11 in the tight configuration when the epoxy 14 later reacts. The epoxy 14 comprising the adhesive cures and holds the individual strands 11 tenaciously against opposing shear forces when the mylar wrapped cables 10 are subject to short circuit forces. The mylar material 15, which is a heat shrinkable polyester film, is selected for convenience of application since it is currently available in both sheet and tape form. It is to be clearly understood that other heat shrinkable polymeric materials can also be employed providing that the material is durable enough to hold the cables during the adhesive melting and thermosetting operations. The polyesters that are satisfactory for the purposes of the invention are thermoplastic synthetic resins not usually containing fatty acids or drying oils. Other thermoplastic heat shrinkable materials can be employed provided that the temperatures at which the thermoplastic materials shrink are selected lower than the adhesive cure temperature but higher than the adhesive melt point. The method for applying the mylar film 15 of FIG. 5 is shown in FIG. 6 wherein a length of transposed cable 10 having individual strands 11 formed in a transposed configuration are wrapped with a layer of mylar 15 over a layer of paper 16 wherein the strands 11 and paper layer 16 are not completely covered. The gaps 8 between the individual wraps of mylar 15 are necessary for outgassing during transformer drying and the subsequent impregnation with transformer oil. The occurrence of free gas at the surface can cause undesirably low corona excitation voltages during transformer test and operation. It is within the scope of the instant invention to employ heat shrinkable porous or microperforated heat shrinkable tapes whereby the substrate materials can readily become outgassed and oil impregnated through the polymeric material thereby allowing the use of the polymeric as the primary insulation. Multiple wraps of the polymeric heat shrinkable material will result in further compaction with a resultant increase in bond area. It is further within the scope of the instant invention to use the wrapping of the heat shrinkable film as a substitute for the paper insulation shown for example in FIGS. 4 and 6 commonly employed with transposed cables. The excellent insulating properties of the polymeric film provides a function similar to the insulating paper while compacting and holding the individual strands in a tight intimate and close-knit configuration.

FIG. 7 shows a winding 9 comprising a plurality of layers of transposed cable 10 further including a wrapping of heat shrinkable film 15 around the individual layers 8. The wrapping of polymeric material 15 around the individual winding layers 8 in combination with the aforementioned winding of polymeric material around the transposed cable used within winding 9 provides a tighter more compact winding substantially increasing the overall shear resistance properties of the winding.

The substantial increases in shear resistance observed by the use of heat shrinkable polymeric films around transposed cable configurations reduces the amount of metal required for use within the cable strands and further reduces the interior volume of the transformer and the transformer overall weight. The decrease, for example, in the amount of wire employed in the transformer windings further decreases the quantity of dielectric oil used for cooling and insulating the transformer 17 of FIG. 8 of the type consisting of a metallic casing 18 and having a plurality of windings 9 concentrically arranged around the core 19. When transposed cables having the configuration depicted in FIG. 6 are used within the windings 9 of transformer 17, the windings are reduced in diameter to such an extent that the transformer casing 18 is correspondingly reduced and the volume of oil contained therein is reduced accordingly.

Once a winding 9 is prepared having the configuration depicted in FIGS. 6 and 7, a plurality of transposed cables 10 containing and wrapping of polymeric material 15, the individual strands 11 become compacted in the following manner. The winding 9 is placed within an evacuation chamber that also contains means for heating the winding to a series of predetermined temperatures. Once the chamber has been evacuated the winding 9 is subjected to a first temperature of at least 70° C. to first cause the epoxy adhesive 14 to soften and then to a second temperature of at least 90° C. in order to cause the mylar 15 to shrink and to move strands 11 into close proximity with each other. Winding 9 is then heated to a temperature of at least 100° C. in order to cause the epoxy adhesive 14 to cure and to become solidified. During evacuation and heating any gasses existing within strands 11, adhesive 14 and paper 16 become evacuated through gaps 8 and through any microperferations 7 which may be provided within the mylar 15. After the heating, evacuating, and curing processes are completed, the winding 19 is removed from the chamber and arranged within a transformer tank in the manner described for the embodiment depicted in FIG. 8. In most applications a large number of layers of insulating paper 16 are provided over the mylar 15 in order to build up the required amount of insulation depending upon the transformer rating. A plurality of layers of mylar 15 can be employed with the layers of insulation paper 16, if desired.

Although the described methods and materials for providing transposed cable configurations according to the invention have application within power transformers, this is by way of example only. The transposed cable of the invention finds application wherever conductor bundles having high flexural strength properties may be required.

What is claimed as new and which it is desired to secure by Letters Patent of the United States is:

1. A method for compacting strands in transposed cables for use within transformers comprising the steps of:
   providing a plurality of adhesive coated insulated wire strands in close proximity with each other in a transposed cable configuration;
   wrapping a layer of heat shrinkable polymeric material around said cable in a gapped configuration to contain said strands in close proximity with each other and to allow for the egress of gaseous material and the impregnation of insulating oil through said gaps;
   arranging said wrapped transposed cable around a winding cylinder to form a transformer winding;
   evacuating said transformer winding;
   heating said transformer winding to a first temperature to cause said adhesive to melt; and
   heating said transformer winding to a second temperature to cause said polymeric material to shrink and to compact said strands.

2. The method of claim 1 including the step of heating said transformer winding to a third temperature to cause said adhesive material to become cured.

3. The method of claim 2 wherein said second temperature is lower than said third temperature and higher than said first temperature.

4. The method of claim 1 wherein said polymeric material comprises a thermoplastic polyester.

5. The method of claim 1 wherein said polymeric material contains a plurality of microperferations for providing further egress means for said gaseous material.

6. The method of claim 1 wherein said first temperature comprises at least 70° C. and wherein said second temperature comprises at least 90° C.

7. The method of claim 6 wherein said third temperature comprises at least 100° C.

* * * * *